Dec. 31, 1957     H. J. HORN     2,818,304
VEHICLE WHEEL COVER
Filed June 3, 1954

INVENTOR.
HARRY J. HORN
BY
ATTORNEYS

United States Patent Office 2,818,304
Patented Dec. 31, 1957

2,818,304
VEHICLE WHEEL COVER

Harry J. Horn, Lansing, Mich., assignor to Motor Wheel Corporation, Lansing, Mich., a corporation of Michigan Application June 3, 1954, Serial No. 434,258

2 Claims. (Cl. 301—108)

This invention relates to vehicle wheels and more particularly to a spring clip for detachably connecting a wheel cover to a vehicle wheel body.

It is an object of this invention to provide a spring clip construction for a wheel which is designed to retain a wheel cover firmly on the wheel and at the same time permit the wheel cover to be readily and easily mounted and removed from a wheel body.

Figure 1:
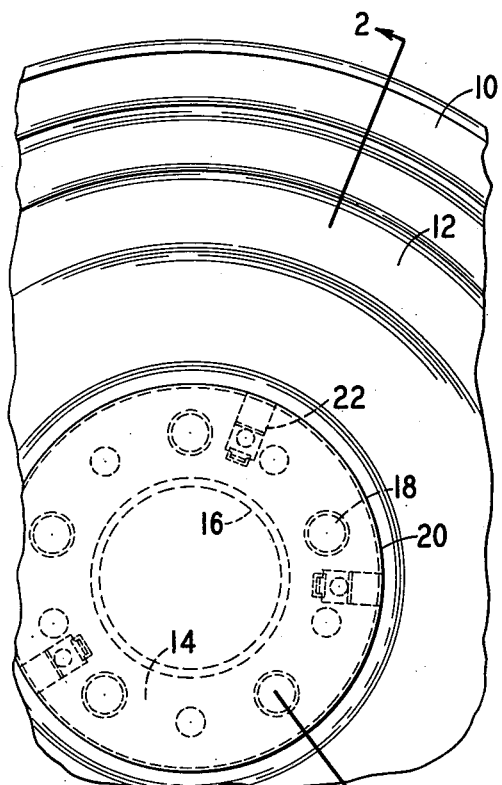
Fig. 1 is a fragmentary front elevation of a wheel having a cover retained thereon by means of spring clips of the present invention.
Figure 2:
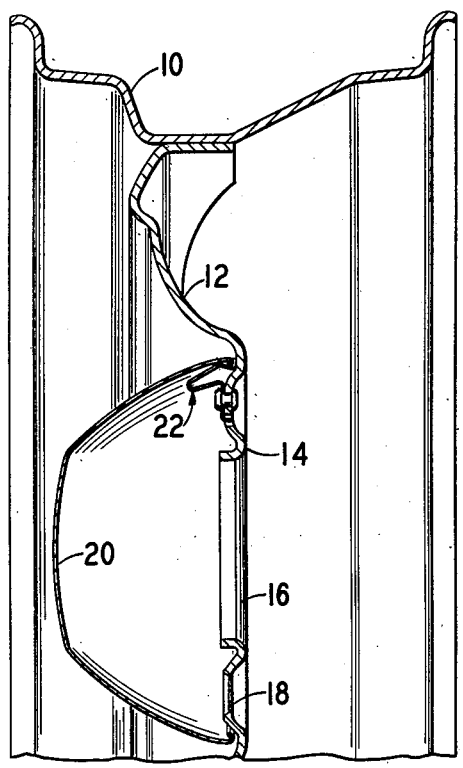
Fig. 2 is a fragmentary sectional view taken along the line 2—2 in Fig. 1.
Figure 3:
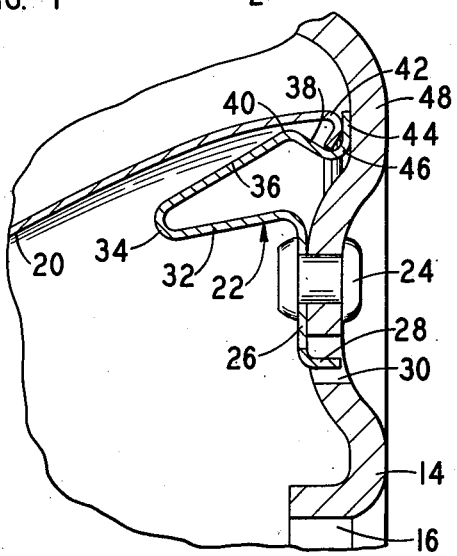
Fig. 3 is a fragmentary enlarged view of a portion of Fig. 2 showing in greater detail the cooperation between the wheel cover, the spring clip and the body of the wheel.
Figure 4:
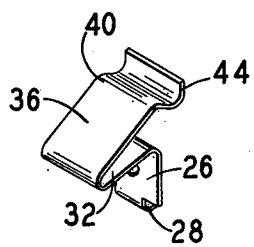
Fig. 4 is a perspective view of the spring clip of this invention.

In the drawings, there is illustrated a vehicle wheel which includes a rim 10 to which is attached as by welding or the like a wheel body 12 having a bolting-on flange 14 at the central portion thereof. The bolting-on flange is centrally apertured as at 16 and is provided with a plurality of circumferentially spaced openings 18 for receiving bolts or the like for mounting the wheel on a wheel hub. A wheel cover in the form of a cup-shaped hub cap 20 is arranged to be mounted on bolting-on flange 14 by means of spring clips 22.

Spring clips 22 are preferably three in number, although a greater or lesser number may be provided if desired. These clips are secured to the bolting-on flange 14 by rivets 24. Clips 22 are formed from spring strip steel having a flat portion 26 seated on a corresponding flat portion of the bolting-on flange 14. The inner end of clip 22 is bent axially inwardly as at 28 and is received within a slot 30 formed in the bolting-on flange 14 to prevent clip 22 from turning about rivet 24.

The flat portion 26 of clip 22 is bent to form an axially outwardly extending leg 32 which is turned inwardly at 34 to provide a generally axially inwardly and radially outwardly directed leg 36, the end portion of which is turned inwardly as at 38 to form a hump 40 for engagement with the rolled peripheral edge 42 of wheel cover 20. The circle defined by the humps 40 has a diameter greater than the inner diameter of the rolled edge 42 of the cover 20. The cover 20 is mounted on the wheel by positioning the rolled edge 42 against the inclined legs 36 of the spring clips 22 and then pushing the cover axially inwardly to flex the legs 32 and 36 radially inwardly and thereby cause the edge 42 of the cover to engage behind the humps 40 of the spring clips. The portions 38 of spring clips 22 are inclined towards the axis of the wheel in an axially inwardly direction and therefore cooperate with the edge 42 of the cover to urge the cover 20 axially inwardly against the outer face of the bolting-on flange 14.

The particular improvement to which the present invention is directed is concerned with the provision of an extension 44 at the outer end of each spring clip 22 which is formed as an open return bent portion at the end of the leg portions 38 of the spring clips 22. The return bent portions 44 extend radially outwardly and contact the outer face of the bolting-on flange 14. The portions 44 and 38 are connected by an arcuately bent portion 46.

It will be observed that the bend 46 and the free end 44 of the spring clips are curved reversely from the humps 40 of these clips. The portions 44 are disposed between the peripheral edge 42 of the cover 20 and the adjacent portions 48 of the bolting-on flange 14 of the wheel. Thus, with this construction, the possibility of the rolled edge 42 of cover 20 becoming hooked over the free end of clip 22 is avoided; and at the same time, the rolled edge 42 of the cover 20 is spaced axially outwardly from the outer face of the wheel body a distance corresponding to the thickness of the stock from which the spring clips 22 are fabricated. The crevice between the edge 42 of the cover 20 and the adjacent portions 48 of the wheel body may not be very wide; but nevertheless, since the wall of the cover 20 is relatively steeply inclined to the plane of the wheel, there is little room to insert a prying tool between the edge of the cover and the portion 48 of the wheel. The provision of a gap at this point, even though the gap is relatively slight, definitely facilitates removal of the cover 20 from the wheel body.

I claim:

1. In combination, a wheel having a body portion, a cover, means mounting said wheel cover on said body portion comprising a plurality of circumferentially spaced spring clips on said body portion, each of said spring clips having a flat inner end secured on said body portion and a free outer end, said clips each having between said ends a pair of arms integrally connected by a return bend, one of said arms extending axially outwardly from said inner end and the other arm extending axially inwardly toward the body portion from said return bend to said free end, said other arm having a hump portion between said return bend and said free end, said free end being reversely bent relative to said hump portion and having a generally radially outwardly extending portion forming a recess on the outer side of said body portion, said cover having its peripheral edge seated in said recesses, said radially outwardly extending portions of said free ends contacting the peripheral edge of said cover at one side thereof and the outer face of said body portion at the other side thereof and limiting the axial inward displacement of said cover relative to said clips and said body portion whereby to provide clearance between the peripheral edge of said cover and the outer face of said body portion.

2. The combination called for in claim 1 wherein the radially outwardly extending portion of the free end of each clip extends radially outwardly beyond the peripheral edge of said cover.

References Cited in the file of this patent

UNITED STATES PATENTS

| | | |
|---|---|---|
| 2,281,153 | Horn | Apr. 28, 1942 |
| 2,493,003 | Lyon | Jan. 3, 1950 |